(12) United States Patent
Ueda et al.

(10) Patent No.: US 12,704,487 B2
(45) Date of Patent: Aug. 11, 2026

(54) METHOD FOR MASS SPECTROMETRY AND CHROMATOGRAPH MASS SPECTROMETER

(71) Applicant: SHIMADZU CORPORATION, Kyoto (JP)

(72) Inventors: Manabu Ueda, Kyoto (JP); Shinjiro Fujita, Kyoto (JP); Junichi Taniguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 273 days.

(21) Appl. No.: 18/382,398

(22) Filed: Oct. 20, 2023

(65) Prior Publication Data

US 2024/0142415 A1 May 2, 2024

(30) Foreign Application Priority Data

Oct. 27, 2022 (JP) ................................ 2022-172003

(51) Int. Cl.

*H01J 49/42* (2006.01)
*G01N 30/72* (2006.01)
*G01N 30/02* (2006.01)

(52) U.S. Cl.

CPC ...... *G01N 30/7233* (2013.01); *H01J 49/4215* (2013.01); *G01N 2030/027* (2013.01)

(58) Field of Classification Search

CPC ......... G01N 30/7233; G01N 2030/027; G01N 2030/047; G01N 30/72; H01J 49/4215; H01J 49/0009

See application file for complete search history.

(56) References Cited

U.S. PATENT DOCUMENTS

| | | | |
|---|---|---|---|
| 4,008,388 A | 2/1977 | McLafferty et al. | |
| 2005/0051720 A1* | 3/2005 | Knecht ............... | H01J 49/0027 250/288 |
| 2008/0265152 A1* | 10/2008 | Bateman ............. | G01N 30/724 250/288 |

(Continued)

FOREIGN PATENT DOCUMENTS

| | | |
|---|---|---|
| WO | 2008/044285 A1 | 4/2008 |
| WO | 2017/056173 A1 | 4/2017 |

(Continued)

*Primary Examiner* — David J Bolduc
(74) *Attorney, Agent, or Firm* — Muir Patent Law, PLLC

(57) ABSTRACT

For a low-cost, high-accuracy tuning of the voltages applied to electrodes in a mass spectrometer, a chromatograph mass spectrometer (1) includes: a medium supplier (11) which supplies a medium as a mobile phase or carrier gas; a passage (15) which introduces, into the mass spectrometer, the medium supplied from the medium supplier; an ionizer (211) which ionizes the medium together with a substance coming from a member forming the passage into the medium; a measurement executer (25, 26, 43) which performs a mass separation and a measurement of a specific ion, using multiple measurement conditions which differ from each other in the value of voltage applied to at least one electrode included in one or more electrodes in the mass spectrometer; and a voltage value determiner (44) which determines the value of voltage applied to each electrode so that the intensity of the ion satisfies a predetermined criterion.

6 Claims, 4 Drawing Sheets

(56) References Cited

U.S. PATENT DOCUMENTS

| | | | | |
|---|---|---|---|---|
| 2010/0012836 | A1 | 1/2010 | Mukaibatake et al. | |
| 2013/0248381 | A1* | 9/2013 | Wilhelm | G01N 27/30 204/406 |
| 2013/0284919 | A1* | 10/2013 | Mukaibatake | H01J 49/4215 250/288 |
| 2015/0102219 | A1* | 4/2015 | Yamamoto | H01J 49/005 250/290 |
| 2016/0329203 | A1* | 11/2016 | Fujita | H01J 49/107 |
| 2018/0366308 | A1* | 12/2018 | Oguri | G01N 30/72 |
| 2019/0013189 | A1 | 1/2019 | Okumura et al. | |
| 2019/0035618 | A1 | 1/2019 | Jeda et al. | |
| 2020/0035479 | A1* | 1/2020 | Yasuda | G01N 30/8651 |
| 2020/0321207 | A1* | 10/2020 | Kitano | H01J 49/4215 |
| 2021/0066057 | A1 | 3/2021 | Shimomura | |
| 2021/0296105 | A1* | 9/2021 | Ukai | H01J 49/005 |
| 2022/0341899 | A1* | 10/2022 | Matama | G01N 30/88 |
| 2023/0253197 | A1* | 8/2023 | Yamada | G01N 30/7206 |

FOREIGN PATENT DOCUMENTS

| | | | |
|---|---|---|---|
| WO | 2017/081770 | A1 | 5/2017 |
| WO | 2019/215792 | A1 | 11/2019 |

* cited by examiner

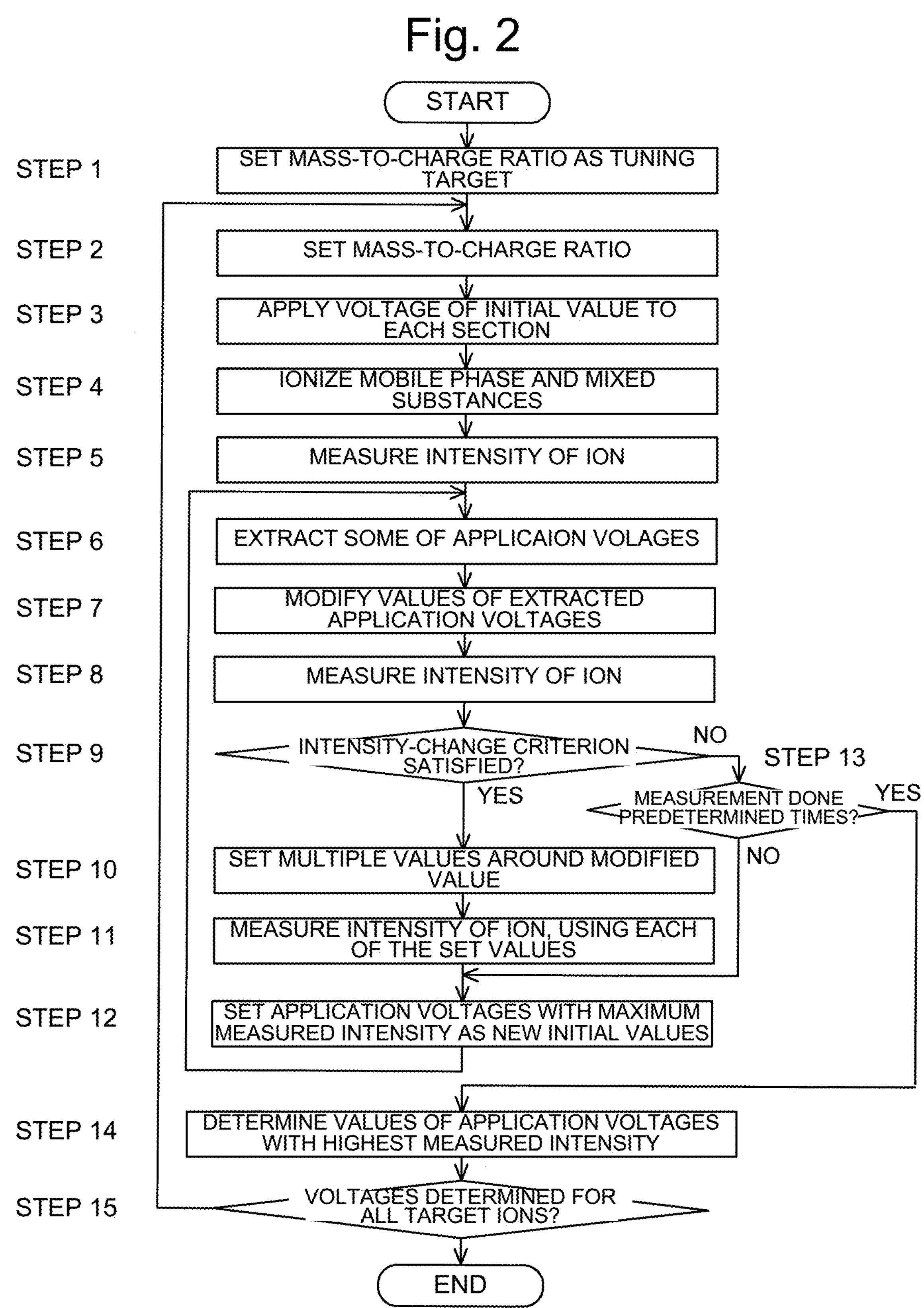
Fig. 2
START
STEP 1
SET MASS-TO-CHARGE RATIO AS TUNING TARGET
STEP 2
SET MASS-TO-CHARGE RATIO
STEP 3
APPLY VOLTAGE OF INITIAL VALUE TO EACH SECTION
STEP 4
IONIZE MOBILE PHASE AND MIXED SUBSTANCES
STEP 5
MEASURE INTENSITY OF ION
STEP 6
EXTRACT SOME OF APPLICAION VOLAGES
STEP 7
MODIFY VALUES OF EXTRACTED APPLICATION VOLTAGES
STEP 8
MEASURE INTENSITY OF ION
STEP 9
INTENSITY-CHANGE CRITERION SATISFIED?
NO
YES
STEP 13
MEASUREMENT DONE PREDETERMINED TIMES?
YES
NO
STEP 10
SET MULTIPLE VALUES AROUND MODIFIED VALUE
STEP 11
MEASURE INTENSITY OF ION, USING EACH OF THE SET VALUES
STEP 12
SET APPLICATION VOLTAGES WITH MAXIMUM MEASURED INTENSITY AS NEW INITIAL VALUES
STEP 14
DETERMINE VALUES OF APPLICATION VOLTAGES WITH HIGHEST MEASURED INTENSITY
STEP 15
VOLTAGES DETERMINED FOR ALL TARGET IONS?
END PRE-ROD BIAS VOLTAGE CHARACTERISTICS FOR m/z168

METHOD FOR MASS SPECTROMETRY AND CHROMATOGRAPH MASS SPECTROMETER

TECHNICAL FIELD

The present invention relates to mass spectrometry.

BACKGROUND ART

Liquid chromatograph mass spectrometers have been used for identifying components contained in a sample and determining their quantities. In a liquid chromatograph mass spectrometer, the components contained in a liquid sample are separated from each other by a column in the liquid chromatograph and sent to a mass spectrometer, which ionizes each component and detects the resultant ions after separating them according to their mass-to-charge ratios.

In the mass spectrometer, the electrodes arranged in specific sections of the mass spectrometer are respectively supplied with predetermined voltages in order to control the flight path of the ions or select a specific ion. Some of the values of the voltages applied to those electrodes are theoretically determined, while others are experimentally determined. For example, the values of the direct voltage and radio-frequency voltage applied to the main rod electrode of a quadrupole mass filter for selecting an ion are theoretically determined based on Mathieu equations. On the other hand, the values of the DC bias voltages applied to the main rod electrode of the quadrupole mass filter and the pre-rod electrode located in front of the main rod electrode (for example, see Patent Literature 1 or 2) are experimentally determined through an actual measurement of an ion. Therefore, in order to determine the values of the voltages applied to the latter group of electrodes, the tuning of the mass spectrometer is performed at the time of the installation of the liquid chromatograph mass spectrometer or after the use of the device for a predetermined period of time.

In many cases, in the tuning of a mass spectrometer, a standard sample prepared for the tuning is used. The standard sample is continuously introduced into the mass spectrometer by being injected from a specially provided gas-pressure liquid-supply mechanism (for example, see Patent Literature 3) into the ionizer (infusion analysis). The standard sample contains a predetermined standard substance (e.g., polyethylene glycol), from which multiple ions having different mass-to-charge ratios are generated. For each of these ions, the values of the voltages respectively applied to the electrodes are determined for each mass-to-charge ratio so that the detection sensitivity for that ion satisfies a predetermined criterium (e.g., the measured intensity is maximized, or the measured intensity exceeds a previously determined threshold). For the mass-to-charge ratios other than those of the ions subjected to the measurement in the tuning, the values of the applied voltages are determined by a linear interpolation using the voltage values determined for the mass-to-charge ratios of the measured ions.

Alternatively, for example, in the case of a high-sensitivity measurement for a trace amount of target substance contained in a sample, a sample prepared by the user themselves, or the actual sample to be analyzed, both of which contain the target substance itself (these samples are hereinafter collectively called the "user sample"), are used for the tuning of the mass spectrometer to determine suitable values of the applied voltages for the measurement-target ions resulting from the target substance. A user sample is normally injected from the injector of the chromatograph into the mobile phase and thereby introduced into the mass spectrometer (flow injection analysis). The values of the voltages applied to the electrodes are determined so that a satisfactory level of detection sensitivity can be achieved for each ion resulting from the target substance.

CITATION LIST

Patent Literature

Patent Literature 1: WO 2008/044285 A
Patent Literature 2: WO 2017/081770 A
Patent Literature 3: WO 2017/056173 A

SUMMARY OF INVENTION

Technical Problem

The conventional mass spectrometer requires a dedicated introduction line, such as a gas-pressure liquid-supply mechanism, for the tuning using the standard sample as well as a mechanism for the switching between the introduction line for the analysis-target sample and the introduction line for the standard sample. This means a corresponding increase in the cost of the device. The tuning which uses a user sample does not incur this type of cost. However, since the user sample is introduced into the mass spectrometer by flow injection, the period of time during which the tuning can be performed is limited to a retention time during which the target substance flows out of the column. Therefore, the measurement of the ions can be performed only for the combinations of a limited number of voltage values, so that it is difficult to perform an accurate tuning. Furthermore, in the case where the user sample is rare and valuable, it may be difficult to prepare a sufficient amount of user sample for the tuning, or that amount of user sample can only be prepared at a high cost.

The problem to be solved by the present invention is to provide a technique by which the voltages applied to the electrodes in a mass spectrometer can be tuned at a lower cost and yet with a higher level of accuracy than in the conventional case.

Solution to Problem

One aspect of the present invention developed for solving the previously described problem is a method for mass spectrometry of a sample introduced from a predetermined passage, the method including:

- introducing a predetermined fluid medium into the passage;
- ionizing the medium together with a substance coming from a member forming the passage into the medium;
- performing a mass separation and a measurement of an ion or ions having one or more previously determined mass-to-charge ratios generated from the substance, under each of a plurality of measurement conditions which differ from each other in the value of voltage applied to at least one electrode included in one or more electrodes provided in a mass spectrometer; and
- determining a value of voltage applied to each of the one or more electrodes so that the intensity of each of the ion or ions having the one or more mass-to-charge ratios satisfies a previously determined criterion.

Another aspect of the present invention developed for solving the previously described problem is a chromatograph mass spectrometer including a chromatograph and a mass spectrometer combined together, including:

a medium supplier configured to supply a medium as a mobile phase or carrier gas;

a passage configured to introduce, into the mass spectrometer, the medium supplied from the medium supplier;

an ionizer configured to ionize the medium together with a substance coming from a member forming the passage into the medium;

a measurement executer configured to perform a mass separation and a measurement of an ion or ions having one or more previously determined mass-to-charge ratios generated from the substance in the ionizer, using each of a plurality of measurement conditions which differ from each other in the value of voltage applied to at least one electrode included in one or more electrodes provided in the mass spectrometer; and a voltage value determiner configured to determine a value of voltage applied to each of the one or more electrodes so that the intensity of each of the ion or ions having the one or more mass-to-charge ratios satisfies a previously determined criterion.

Advantageous Effects of Invention

In the method for mass spectrometry according to the present invention, a predetermined fluid medium is introduced into a predetermined passage provided for introducing a sample. During the period of time until this medium reaches the ionizer, various substances adhered to the wall surface of the medium's passage and other locations are mixed into the medium. These substances are the origins of the so-called background in a measurement of a sample. In the method for mass spectrometry according to the present invention, those background-causing substances are used for the tuning of the mass spectrometer. That is to say, those substances flowing into the ionizer together with the medium are ionized, and a mass separation and measurement of an ion or ions having one or more previously determined mass-to-charge ratios generated from the substances are performed under a plurality of measurement conditions which differ from each other in the value of voltage applied to at least one electrode. There are various background-causing substances, from which ions are generated evenly over a wide range of mass-to-charge ratios. Therefore, an ion having a desired mass-to-charge ratio can be used for the tuning.

The chromatograph mass spectrometer according to the present invention is used for carrying out the method for mass spectrometry according to the present invention. In the chromatograph mass spectrometer according to the present invention, the mobile phase (in the case of a liquid chromatograph) or carrier gas (in the case of a gas chromatograph) used in a measurement of a sample is used as the aforementioned medium, and an ion or ions generated from substances mixed in the medium are used for the tuning. Since no standard sample for the tuning is used, the present invention does not require providing a dedicated line for introducing the standard sample, so that the cost of the device can be reduced. It is also unnecessary to use a user sample which is rare or expensive. Since the mobile phase or carrier gas is continuously introduced into the mass spectrometer (infusion analysis), the period of time in which the tuning can be performed will not be limited as in the case of the flow injection analysis. Accordingly, it is possible to finely set the value of voltage applied to each electrode and accurately tune the mass spectrometer.

BRIEF DESCRIPTION OF DRAWINGS

FIG. 2 is a flowchart concerning the tuning of a device in one embodiment of the method for mass spectrometry according to the present invention.

DESCRIPTION OF EMBODIMENTS

One embodiment of the method for mass spectrometry and the chromatograph mass spectrometer according to the present invention is hereinafter described with reference to the drawings. The chromatograph mass spectrometer according to the present embodiment is a liquid chromatograph mass spectrometer 1.

Figure 1:
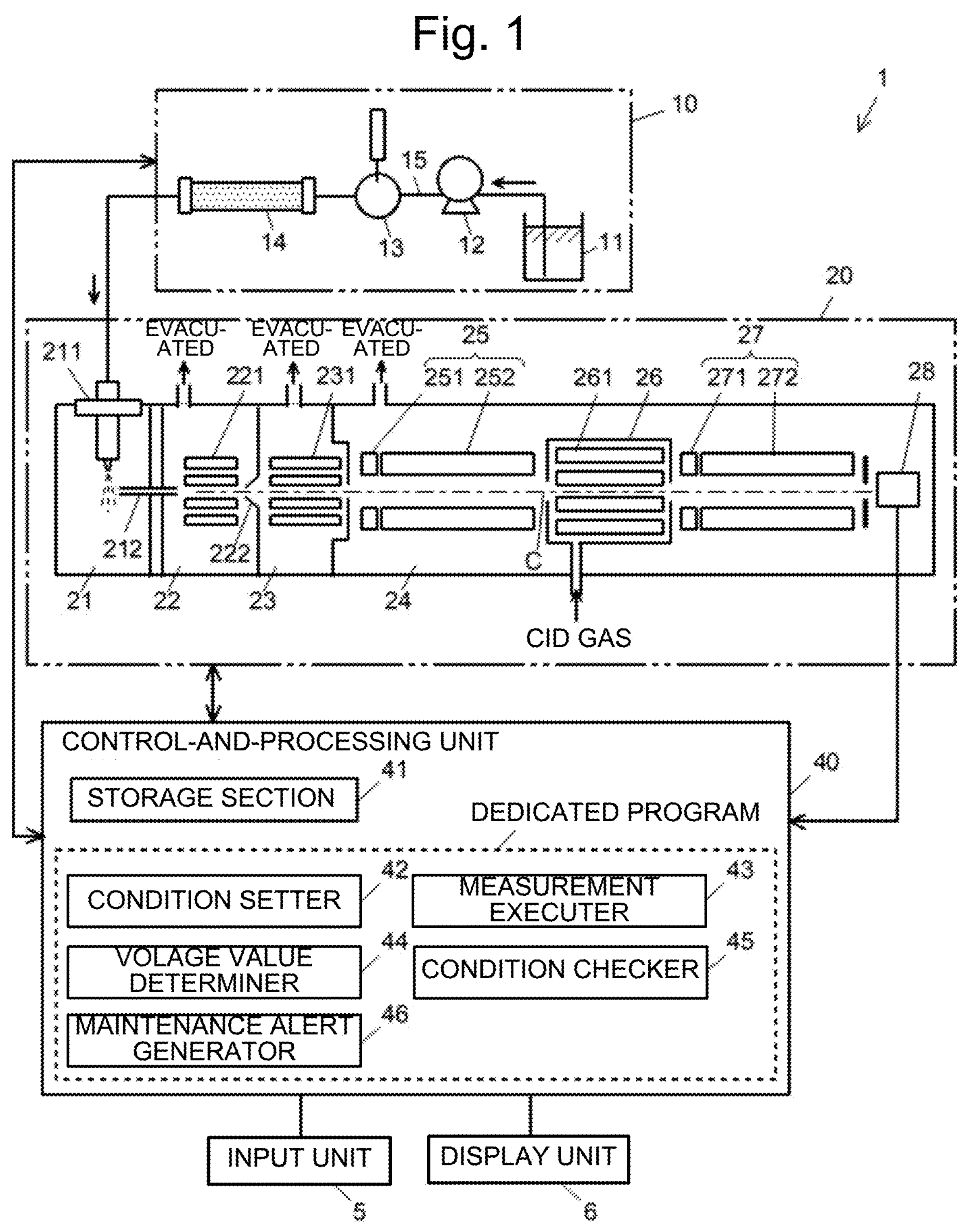
FIG. 1 is a configuration diagram of the main components of a liquid chromatograph mass spectrometer used for carrying out one embodiment of the method for mass spectrometry according to the present invention.

FIG. 1 is a configuration diagram of the main components of the liquid chromatograph mass spectrometer 1. The liquid chromatograph mass spectrometer according to the present embodiment includes a liquid chromatograph 10, mass spectrometer 20 and control-and-processing unit 40 configured to control the operations of those devices.

The liquid chromatograph 10 includes: a mobile phase container 11 in which a mobile phase is stored; a pump 12 for drawing the mobile phase and supplying it to a passage 15 at a constant flow rate; an injector 13 for injecting a liquid sample into the mobile phase flowing through the passage 15; and a column 14 for separating compounds contained in the liquid sample. In the case of continuously analyzing a plurality of liquid samples, an autosampler (not shown) is additionally provided, and a plurality of liquid samples set in this autosampler are sequentially injected from the injector 13.

The mass spectrometer 20 includes an ionization chamber 21 and a vacuum chamber. The vacuum chamber is evacuated with vacuum pumps (not shown). The vacuum chamber internally has a first intermediate vacuum chamber 22, second intermediate vacuum chamber 23 and analysis chamber 24 sequentially arranged from the ionization chamber 21, having the configuration of a multistage differential pumping system in which the degrees of vacuum of those chambers are increased in the mentioned order.

In the ionization chamber 21, an electrospray ionization (ESI) probe 211 configured to spray a sample solution while imparting electric charges to the same solution is installed.

The ionization chamber 21 communicates with the first intermediate vacuum chamber 22 in the next stage through a thin heated capillary 212.

The first intermediate vacuum chamber 22 contains an ion guide 221 formed by a plurality of rod electrodes. The ion guide 221 is configured to converge the flight path of ions along the ion beam axis C. The first intermediate vacuum chamber 22 is separated from the second intermediate vacuum chamber 23 by a skimmer 222 having a small hole at its apex.

The second intermediate vacuum chamber 23 contains an ion guide 231 formed by a plurality of rod electrodes. Similar to the ion guide 221, the ion guide 231 is configured to converge the flight path of ions along the ion beam axis C. The second intermediate vacuum chamber 23 is separated from the analysis chamber 24 by a partition wall in which a small hole is bored.

The analysis chamber 24 contains a front quadrupole mass filter 25, collision cell 26, rear quadrupole mass filter 27 and ion detector 28. The front quadrupole mass filter 25 has a pre-rod electrode 251 and a main rod electrode 252. The collision cell 26 contains a multipole ion guide 261. A CID (collision-induced dissociation) gas is introduced from a gas source (not shown) into the collision cell 26. The rear quadrupole mass filter 27 has a pre-rod electrode 271 and a main rod electrode 272.

The mass spectrometer 20 can perform a selected ion monitoring (SIM) measurement, MS/MS scan (product-ion scan) measurement, multiple reaction monitoring (MRM) measurement and other types of measurements. In the SIM measurement, the front quadrupole mass filter 25 performs no selection of ions (i.e., it is not enabled to function as a mass filter), while the mass-to-charge ratio of the ion to be allowed to pass through the rear quadrupole mass filter 27 is fixed to detect a specific ion.

On the other hand, in the MS/MS scan measurement or MRM measurement, both the front quadrupole mass filter 25 and the rear quadrupole mass filter 27 are enabled to function as mass filters. In the front quadrupole mass filter 25, only an ion designated as a precursor ion is allowed to pass through. Meanwhile, a CID gas is supplied into the collision cell 26, and the precursor ion is accelerated and introduced into this cell in order to make the precursor ion collide with the CID gas and thereby promote the fragmentation of the precursor ion. In the case of the MS/MS scan measurement, the mass-to-charge ratio of the ion to be allowed to pass through the rear quadrupole mass filter 27 is continuously varied for a mass scan. In the case of the MRM measurement, the mass-to-charge ratio of the ion to be allowed to the rear quadrupole mass filter 27 is fixed to allow only a product ion having a specific mass-to-charge ratio to pass through.

The control-and-processing unit 40 has a storage section 41. The storage section 41 holds information of the values of the voltages applied to each related component determined in the previous tuning (in the case of the first tuning, the information of the values of the voltages applied to each related component is determined by the tuning in an appropriate stage, e.g., before the shipping of the device). The values of the voltages applied to the related components are categorized into those which are theoretically determined and those which are experimentally determined through the tuning.

The control-and-processing unit 40 includes, as its functional blocks, a condition setter 42, measurement executor 43, voltage value determiner 44, condition checker 45 and maintenance alert generator 46. The control-and-processing unit 40 is actually a personal computer, on which a dedicated program previously installed on the same computer is executed to cause this computer to function as the aforementioned sections. Additionally, an input unit 5 including a mouse, keyboard or similar device, as well as a display unit 6 including a liquid crystal display or similar device are connected to the control-and-processing unit 40.

The liquid chromatograph mass spectrometer 1 according to the present embodiment is characterized by the operation performed when tuning the voltages applied to the related components in the mass spectrometer 20.

As described earlier, the mass spectrometer 20 includes the ion guide 221, ion guide 231, pre-rod electrode 251, main rod electrode 252, multipole ion guide 261, pre-rod electrode 271 and main rod electrode 272. When a mass spectrometric analysis is performed, a direct voltage and/or a radio-frequency voltage is applied to each of those electrodes. In addition to those electrodes, the partition wall to which the heated capillary 212 is attached, as well as the entrance and exit ends of the collision cell 26 are also supplied with voltages for setting their respective predetermined potentials (including the grounding).

The values of the voltages applied to the aforementioned components include those theoretically determined and those experimentally determined. For example, the values of the direct and radio-frequency voltages for selecting an ion, which are applied to the main rod electrode 252 of the front quadrupole mass filter 25 or the main rod electrode 272 of the rear quadrupole mass filter 27, are theoretically determined based on the Mathieu equations. The partition wall mentioned earlier is grounded in many cases. On the other hand, the values of the direct voltages (DC bias voltages) applied to the pre-rod electrode 251 and the main rod electrode 252 of the front quadrupole mass filter 25 as well as the pre-rod electrode 271 and the main rod electrode 272 of the rear quadrupole mass filter 27, in order to form a potential gradient for transporting ions to the subsequent stages or creating an energy barrier, are experimentally determined by an actual measurement of ions.

For the tuning of the mass spectrometer 20 in the liquid chromatograph mass spectrometer 1 according to the present embodiment, a mobile phase to be used for the tuning should be stored beforehand in the mobile phase container 11. There are various mobile phases that can be used, examples of which include alcohols (e.g., methanol or ethanol), acetonitrile, water (with the pH adjusted as needed), acetic acid, formic acid, trifluoroacetic acid, ammonia water, ammonium acetate, ammonium formate, perfluoro carbon (C2-C8), dibutyl amine, triethyl amine, DMSO, DMF, THF, acetone, ester, chloroform, benzene and hexane. If measurements of samples are performed before and after the tuning of the mass spectrometer 20, the mobile phase to be used in those measurements may be directly used.

In the liquid chromatograph mass spectrometer 1 according to the present embodiment, a user issues a command to execute the tuning of the device by a predetermined operation through the input unit 5. Then, the condition setter 42 displays, on the display unit 6, a screen for entering the mass-to-charge ratios of the ions for which the tuning should be performed. On this screen, the user can enter the value or values of one or more mass-to-charge ratios.

FIG. 2 is a flowchart showing the steps for tuning the voltages applied to the related components of the mass spectrometer 20 in the liquid chromatograph mass spectrometer 1 according to the present embodiment.

After the user has entered the mass-to-charge ratio of the ions for which the tuning should be performed (Step 1), the measurement executor 43 reads, from the storage section 41, the information of the values (initial values) of the voltages applied to the related components determined in the previous tuning.

The measurement executor 43 activates the pump 12 to send the mobile phase from the mobile phase container 11 to the ESI probe 211. The mobile phase is continuously introduced until the tuning of the mass spectrometer 20 is completed (infusion analysis). During this period, nothing is injected from the injector 13. If the passage in the liquid chromatograph 10 is switchable to a passage 15 which bypasses the column 14, the mobile phase may be sent to the ESI probe 211 without passing through the column 14. While the mobile phase is flowing from the mobile phase container 11 to the ESI probe 211, various substances adhered to the wall surface of the passage 15 and other locations are mixed into the mobile phase, to be introduced into the ESI probe 211 together with the mobile phase.

In the liquid chromatograph mass spectrometer 1 according to the present embodiment, the measurement executor 43 determines the values of the voltages applied to the related components by a meta heuristic method, following the process flow as will be described later. There are various algorithms available for the meta heuristic method, examples of which include a genetic algorithm (GA), tabu search (TS), simulated annealing (SA), particle swarm optimization (PSO), ant colony optimization (ACO), evolutionary programming (EP) and immune algorithm. The following is a specific example of this type of method.

The measurement executor 43 sets the value of one of the entered mass-to-charge ratios (e.g., the smallest mass-to-charge ratio) as the tuning target (Step 2) and applies, to the related components, the voltages having the initial values related to that value of the mass-to-charge ratio (Step 3). Then, the mobile phase and the various substances which have flown into the system along with the mobile phase are sprayed from the ESI probe 211 and ionized (Step 4). The ionization condition can be appropriately determined according to the type of used mobile phase. Alternatively, a standard ESI condition may be applied. Among the resultant ions, an ion having the mass-to-charge ratio designated as the tuning target is selected by the front quadrupole mass filter 25 (or the rear quadrupole mass filter 27) and detected by the ion detector 28 (Step 5).

Next, one or more types of voltages are selected from the voltages to be experimentally determined by the tuning (Step 6). For each selected voltage, the voltage value is changed from its initial value by a first predetermined amount, e.g., 10% of the initial value (Step 7). The types and number of voltages to be selected may be previously specified or randomly determined for each tuning. Then, the previously described steps are performed once again: the mobile phase and the various substances mixed into the mobile phase are sprayed from the ESI probe 211, the ion having the mass-to-charge ratio designated as the tuning target is selected in the front quadrupole mass filter 25 (or the rear quadrupole mass filter 27), and its intensity is measured with the ion detector 28 (Step 8).

The measurement executor 43 determines whether or not the measured intensity of the ion satisfies a predetermined criterion (e.g., at least 5% of increase in measured intensity) as compared to the value recorded when the voltages with the initial values were applied (Step 9). If the criterion is satisfied ("YES" in Step 9), the values of the types of voltages which were previously modified are further modified (Step 10). This time, however, multiple values are set by incrementally modifying each voltage value by a second predetermined amount (e.g., 2% of the voltage value), which is smaller than the first predetermined amount, and the intensity of the ion is measured in the previously described manner, using each modified value (Step 11). In summary, the first predetermined amount is intended for changing the value of applied voltage to a certain extent in order to verify its effectiveness, whereas the second predetermined amount is intended for performing a finer tuning when the effectiveness has been confirmed. After the measured intensity of the ion has been obtained for each of the set values, the combination of the applied voltage values which yielded the highest measured intensity is set as the new initial values (Step 12), and one or more voltages are selected once again (Step 6) to similarly repeat the previously described procedure. It should be noted that the one or more voltages selected this time should be different from the previous selection.

When the measured intensity of the ion does not satisfy the predetermined criterion as compared to the value recorded when the voltages with the initial values were applied ("NO" in Step 9), the measurement executor 43 determines whether or not the number of times of the measurement of the ion having the mass-to-charge ratio concerned has reached a predetermined number of times (Step 13). The predetermined number of times can be appropriately determined taking into account the required accuracy of the tuning, required period of time for the tuning and other factors. For example, it may be 100 times. In the present situation, the number of times of the measurement has not yet reached the predetermined number of times ("NO" in Step 13), so that the modified applied voltage values are reset to the latest initial values (Step 12) and the operation returns to Step 6 to select one or more voltages different from the previous selection and similarly repeat the previously described procedure.

When the number of times of the measurement has reached the predetermined number of times ("YES" in Step 13), the voltage value determiner 44 designates the combination of the applied voltages which have yielded the highest measured intensity among the intensities recorded so far, as the applied voltage values related to the ion having the mass-to-charge ratio concerned (Step 14).

Subsequently, whether or not the values of the applied voltages have been determined for all ions designated as the tuning target is determined (Step 15). If there is an ion remaining for the measurement ("NO" in Step 15), the operation returns to Step 2 to similarly repeat the previously described procedure. The tuning is discontinued when the values of the applied voltages have been determined for all ions by the voltage value determiner 44 ("YES" in Step 15).

In a conventional case of tuning a mass spectrometer, a standard sample prepared for the tuning is introduced from a specially provided gas-pressure liquid-supply mechanism into the ESI probe, or a sample prepared by a user themselves ("user sample") is introduced into the ESI probe together with the mobile phase. In the case of using a standard sample, it is necessary to provide a dedicated introduction line, such as a gas-pressure liquid-supply mechanism, as well as a mechanism for switching between the introduction line for the analysis target sample and the introduction line for the standard sample, so that the device becomes correspondingly large and expensive. In the case of using a user sample, since the user sample is introduced into the mass spectrometer by flow injection, the period of time during which the tuning can be performed is limited to a retention time during which the target substance flows out of the column. Therefore, the measurement of the ions can be performed only for the combinations of a limited number of voltage values, so that it is difficult to perform an accurate tuning. In particular, in the case of determining the values of a large number of types of applied voltages by the tuning, the number of combinations of the values is so large that it is difficult to obtain an appropriate tuning result within the limited period of time. Furthermore, in the case where the user sample is rare and valuable, it may be difficult to prepare a sufficient amount of user sample for the tuning, or that amount of user sample can only be prepared at a high cost.

In the liquid chromatograph mass spectrometer 1 according to the present embodiment, the mobile phase prepared for introducing a sample is directly used for the tuning. During the period of time until the mobile phase reaches the ESI probe 211, various substances adhered to the wall surface of the passage 15 and other locations are mixed into the mobile phase. These substances are foreign substances from which the so-called background originates in a measurement of a sample. At the same time, they also serve as the origins of ions covering a wide range of mass-to-charge ratios. Therefore, an ion having a desired mass-to-charge ratio can be selected and used for the tuning. Furthermore, in the liquid chromatograph mass spectrometer 1 according to the present embodiment, since the mobile phase and its passage used in the measurement of the sample are directly used for the tuning, it is possible to perform the tuning while continuously supplying the mobile phase by infusion analysis even without a dedicated liquid-supply mechanism.

Figure 3:
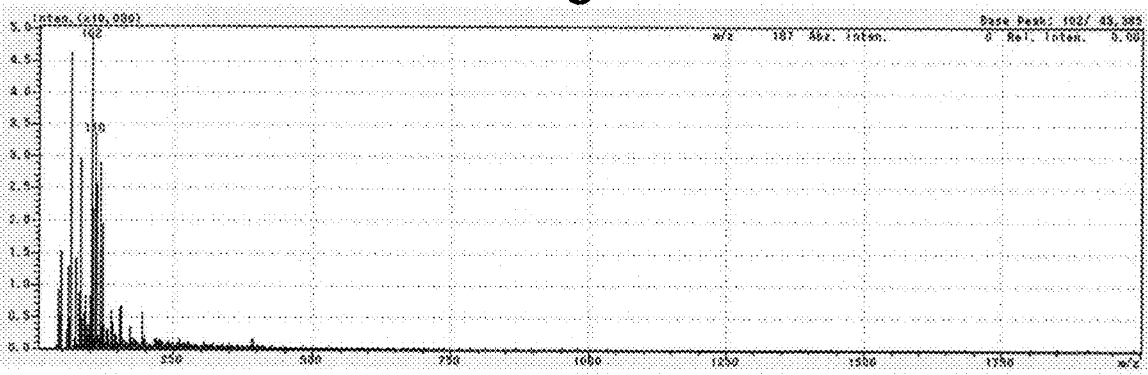
FIG. 3 is a mass spectrum of a mobile phase prepared by mixing water and acetonitrile, acquired by the liquid chromatograph mass spectrometer according to the present embodiment.
Figure 4:
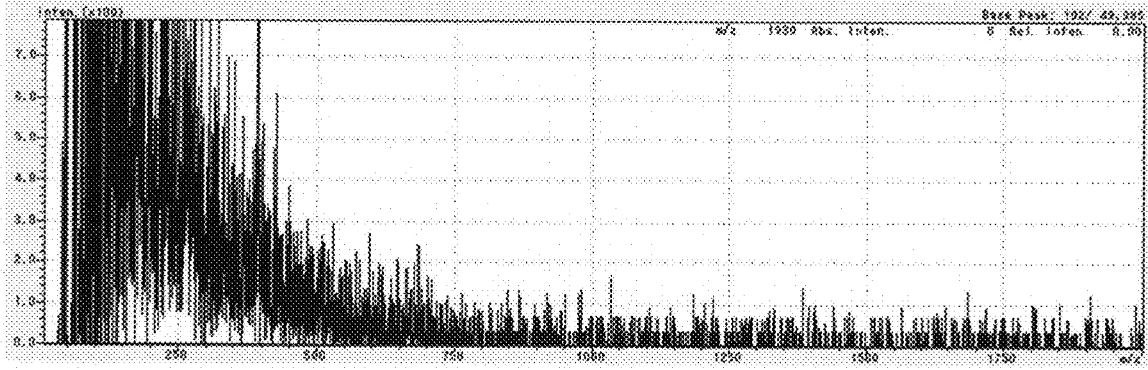
FIG. 4 is an enlarged view of the mass spectrum of the mobile phase prepared by mixing water and acetonitrile, acquired by the liquid chromatograph mass spectrometer according to the present embodiment.

Hereinafter described is the result of a tuning test of the mass spectrometer 20 actually performed using the liquid chromatograph mass spectrometer 1 according to the present embodiment. A mobile phase prepared by mixing water and acetonitrile at a ratio of 3:7 was used as the mobile phase and supplied at 0.4 ml/min. FIG. 3 shows a mass spectrum obtained by an MS scan measurement of this mobile phase. FIG. 4 shows the same mass spectrum, with the vertical axis (intensity) expanded by a factor of 100. It should be noted that the vertical axis indicates a normalized intensity, with a value of 1 representing the maximum measured intensity. The horizontal axis indicates a normalized value (normalized voltage) of the difference (relative voltage) from the voltage applied to a predetermined reference position, with a value of 1 representing the entire tuning range.

As can be seen in those mass spectra (in particular, the mass spectrum in FIG. 4), although the mobile phase is a mixture of water and acetonitrile, ions are generated over a wide range of mass-to-charge ratios from substances which are neither water nor acetonitrile. Accordingly, the tuning of the mass spectrometer 20 can be performed for a desired mass-to-charge ratio.

Figure 5:
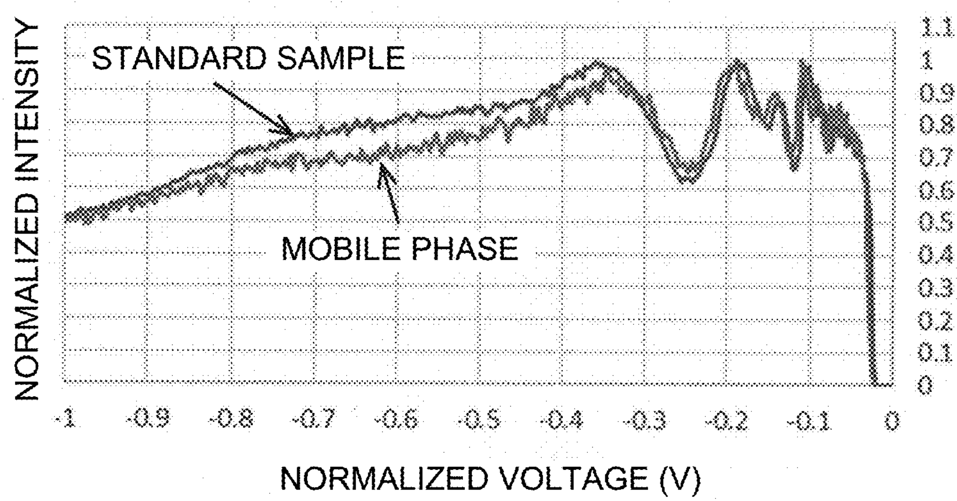
FIG. 5 is a diagram comparing the result of the tuning performed with a mobile phase and that of the tuning performed with a standard sample in the liquid chromatograph mass spectrometer according to the present embodiment.

FIG. 5 shows a comparison of the results of an experiment in which a change in the intensity of a positive ion (with a mass-to-charge ratio of 168) was measured with respect to the value of voltage applied to the pre-rod electrode 251 of the front quadrupole mass filter 25, using a standard sample (polyethylene glycol) prepared for the tuning of the mass spectrometer and the aforementioned mobile phase. In other words, it shows a measurement result obtained in the tuning of the voltage applied to the pre-rod electrode 251. As can be seen in FIG. 5, a tuning result obtained in the case of using the mobile phase was comparable to the result obtained in the case of using the special standard sample.

As described in Patent Literature 1, a slight change in the value of voltage applied to the pre-rod electrode 251 of the front quadrupole mass filter 25 or the pre-rod electrode 271 of the rear quadrupole mass filter 27 causes a significant change in the measured intensity of an ion. Therefore, when the value of DC bias voltage at the mass-to-charge ratio of a measurement-target ion generated from a target sample is determined by linear interpolation based on the result of the tuning using a standard sample as in the conventional case, a slight deviation of the voltage value from an appropriate value (i.e., a voltage value which yields the maximum or nearly maximum intensity) will cause a dramatic decrease in measured intensity. Accordingly, it is advantageous to determine an appropriate value of applied voltage for a measurement-target ion while continuously introducing the mobile phase by infusion as in the present embodiment.

Figure 6:
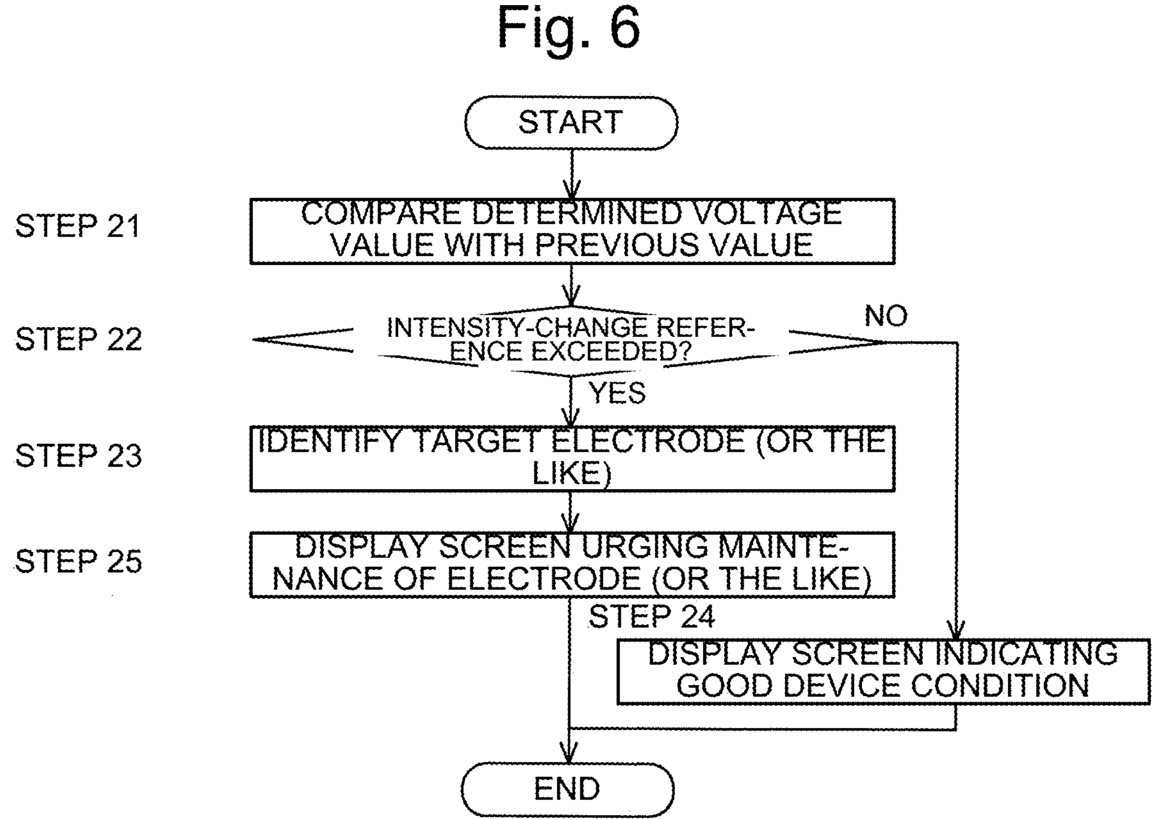
FIG. 6 is a flowchart concerning the condition check of the device in the method for mass spectrometry according to the present embodiment.

The liquid chromatograph mass spectrometer 1 according to the present embodiment is further capable of urging the user to the maintenance of the related components of the mass spectrometer 20 based on the values of the voltages applied to those components determined by the tuning. FIG. 6 is a flowchart concerning the condition check of the device to be performed after the tuning of the mass spectrometer 20.

After the tuning of the mass spectrometer 20 has been completed, the condition checker 45 compares the value of voltage applied to each component determined by the voltage value determiner 44 with the value of voltage applied to each component currently saved in the storage section 41 (Step 21). If there is a voltage value for which the difference between the two aforementioned values shows a change that exceeds a previously determined value, e.g., 30% of the value saved in the storage section 41 ("YES" in Step 22), the voltage-applied portion, such as the electrode to which the voltage of that value is applied, is identified (Step 23). If a change that exceeds the previously determined value is not present in any of the voltages concerned ("NO" in Step 22), a screen indicating that the mass spectrometer 20 is in good condition is shown on the display unit 6 (Step 24).

A possible cause of a significant change in the value of applied voltage determined by the turning is that the electrode or similar portion to which the voltage is applied has been contaminated or oxidized, or in other words, that the condition of that portion has changed since the previous tuning. Leaving such a condition untreated will lead to a decrease in the sensitivity or accuracy of mass spectrometry. Accordingly, for the electrode or the like (or the unit which includes the electrode or the like) identified by the condition checker 45, the maintenance alert generator 46 shows, on the display unit 6, a screen which displays the magnitude of the change from the voltage value determined in the previous tuning, with a message urging the maintenance of the electrode or the like (Step 25). This screen allows the user to easily understand which electrode (or the like) needs maintenance.

The previously described embodiment is a preferable example and can be appropriately changed or modified within the spirit of the present invention.

The previously described embodiment was a liquid chromatograph mass spectrometer 1. A similar configuration to the previously described embodiment can also be adopted in other types of mass spectrometers configured to perform a mass spectrometric analysis of a sample introduced from a predetermined passage, such as a gas chromatograph mass spectrometer. The type of internal configuration of the mass spectrometer 20 (such as the ionizer, ion optical systems and mass filters) can be appropriately changed and are not limited to the configuration according to the previously described embodiment.

The previously described embodiment was an example in which the values of the voltages applied to the related components were determined by a meta heuristic technique.

This is due to the fact that meta heuristic techniques are useful for simultaneously optimizing a number of parameters and determining a satisfactory combination of the values. In a mass spectrometer, the potential of the skimmer (the ground potential) is used as the reference, and a potential gradient for transporting ions to the subsequent stages or creating an energy barrier is formed by applying DC bias voltages to the elements located in the subsequent stages of the skimmer. Since this potential gradient is determined by the relationship of the values of a plurality of applied voltages, it is necessary to simultaneously tune the values of those applied voltages in the tuning. In such a case, an appropriate result can be efficiently obtained by using a meta heuristic technique. However, the use of a meta heuristic technique is not essential in the method for mass spectrometry according to the present invention. The values of the applied voltages may be determined by other methods, e.g., by measuring the intensity of an ion for all combinations of the values of the voltages applied to the related components.

In the previously described embodiment, the measurement for an ion having one mass-to-charge ratio is performed a predetermined number of times, and the values of the applied voltages which yielded the highest measured intensity are selected as the tuning result. Other methods may alternatively be adopted. For example, the values of the applied voltages for the electrodes (or the likes) may be determined so that a previously determined condition will be satisfied, as in the case where the measurement of an ion having the mass-to-charge ratio concerned is discontinued when the ion has been detected with a measured intensity that exceeds a previously determined threshold, and the values of the applied voltages at that point in time are selected as the tuning result.

The information for urging the maintenance of an electrode (or the like), which is displayed on the screen of the display unit 6 in the previously described embodiment, may be provided in other forms, such as an audio output, printout, or the lighting of a maintenance lamp.

[Modes]

It is evident for a person skilled in the art that the previously described illustrative embodiment is a specific example of the following modes of the present invention.

(Clause 1)

One mode of the present invention is a method for mass spectrometry of a sample introduced from a predetermined passage, the method including:

- introducing a predetermined fluid medium into the passage;
- ionizing the medium together with a substance coming from a member forming the passage into the medium;
- performing a mass separation and a measurement of an ion or ions having one or more previously determined mass-to-charge ratios generated from the substance, under each of a plurality of measurement conditions which differ from each other in the value of voltage applied to at least one electrode included in one or more electrodes provided in a mass spectrometer; and
- determining a value of voltage applied to each of the one or more electrodes so that the intensity of each of the ion or ions having the one or more mass-to-charge ratios satisfies a previously determined criterion.

(Clause 2)

Another mode of the present invention is a chromatograph mass spectrometer including a chromatograph and a mass spectrometer combined together, including:

- a medium supplier configured to supply a medium as a mobile phase or carrier gas;
- a passage configured to introduce, into the mass spectrometer, the medium supplied from the medium supplier;
- an ionizer configured to ionize the medium together with a substance coming from a member forming the passage into the medium;
- a measurement executer configured to perform a mass separation and a measurement of an ion or ions having one or more previously determined mass-to-charge ratios generated from the substance in the ionizer, using each of a plurality of measurement conditions which differ from each other in the value of voltage applied to at least one electrode included in one or more electrodes provided in the mass spectrometer; and
- a voltage value determiner configured to determine a value of voltage applied to each of the one or more electrodes so that the intensity of each of the ion or ions having the one or more mass-to-charge ratios satisfies a previously determined criterion.

In the method for mass spectrometry according to Clause 1, a predetermined fluid medium is introduced into a predetermined passage provided for introducing a sample. During the period of time until this medium reaches the ionizer, various substances adhered to the wall surface of the medium's passage and other locations are mixed into the medium. These substances are the origins of the so-called background in a measurement of a sample. In the method for mass spectrometry according to Clause 1, those background-causing substances are used for the tuning of the mass spectrometer. That is to say, those substances flowing into the ionizer together with the medium are ionized, and a mass separation and measurement of an ion or ions having one or more previously determined mass-to-charge ratios generated from the substances are performed under a plurality of measurement conditions which differ from each other in the value of voltage applied to at least one electrode. There are various background-causing substances, from which ions are generated evenly over a wide range of mass-to-charge ratios. Therefore, an ion having a desired mass-to-charge ratio can be used for the tuning.

The chromatograph mass spectrometer according to Clause 2 is used for carrying out the method for mass spectrometry according to Clause 1. In the chromatograph mass spectrometer according to Clause 2, the mobile phase (in the case of a liquid chromatograph) or carrier gas (in the case of a gas chromatograph) used in a measurement of a sample is used as the aforementioned medium, and an ion or ions generated from substances mixed in the medium are used for the tuning. Since no standard sample for the tuning is used, the method for mass spectrometry according Clause 1 and the chromatograph mass spectrometer according to Clause 2 do not require providing a dedicated line for introducing the standard sample, so that the cost of the device can be reduced. It is also unnecessary to use a user sample which is rare or expensive. Since the mobile phase or carrier gas is continuously introduced into the mass spectrometer (infusion analysis), the period of time in which the tuning can be performed will not be limited as in the case of the flow injection analysis. Accordingly, it is possible to finely set the value of voltage applied to each electrode and accurately tune the mass spectrometer.

(Clause 3)

A chromatograph mass spectrometer according to Clause 3 is a chromatograph mass spectrometer according to Clause 2, where:

the mass spectrometer includes a quadrupole mass filter having a pre-rod electrode and a main rod electrode; and the at least one electrode is the pre-rod electrode.

A slight deviation of the voltage applied to the pre-rod electrode causes a significant change in measured intensity. The chromatograph mass spectrometer according to Clause 3 can determine an appropriate value of applied voltage for the pre-rod electrode.

(Clause 4)

A chromatograph mass spectrometer according to Clause 4 is a chromatograph mass spectrometer according to Clause 2 or 3, where:

the measurement executor is configured to repeatedly perform an operation in which an intensity of an ion under a first measurement condition is compared with an intensity of the ion under a second measurement condition in which one or more of the values of the applied voltages included in the first measurement condition are modified, and when the intensity of the ion under the second measurement condition is higher, an intensity of the ion is measured under a third measurement condition in which one or more of the values of the applied voltages in the second measurement condition are modified.

In the chromatograph mass spectrometer according to Clause 4, the value of voltage applied to each electrode is determined by a so-called meta heuristic method. According to this method, one or more of the values of a plurality of applied voltages are modified, and the measurement condition is progressively modified based on a fact that the intensity of the ion increased after the modification of the voltage values. This technique reduces the number of times of the execution of the measurement and thereby enables quick optimization of the values of the applied voltages.

(Clause 5)

A chromatograph mass spectrometer according to Clause 5 is a chromatograph mass spectrometer according to one of Clauses 2-4 and further includes:

a storage section in which information of a reference value of applied voltage for each of the one or more electrodes is stored; and a comparison result output section configured to output a result of a comparison of a value of applied voltage determined by the voltage value determiner and the reference value of applied voltage stored in the storage section for each of the one or more electrodes.

In the chromatograph mass spectrometer according to Clause 5, the value of voltage applied to each electrode which was determined, for example, by a tuning performed when the chromatograph mass spectrometer was installed is stored in the storage section. The chromatograph mass spectrometer according to Clause 5 can check whether or not the condition of the mass spectrometer has changed, based on the magnitude of the difference between the value of applied voltage determined by the voltage value determiner and the reference value.

(Clause 6)

A chromatograph mass spectrometer according to Clause 6 is a chromatograph mass spectrometer according to Clause 5, where the comparison result output section further includes a maintenance information output section configured to output information for urging a user to maintenance of an electrode in the one or more electrodes when the difference between the voltage applied to that electrode determined by the voltage value determiner and the reference value of applied voltage stored in the storage section exceeds a previously determined threshold.

The chromatograph mass spectrometer according to Clause 6 allows users to easily recognize the timing for the maintenance of an electrode whose condition has changed due to the aging (or the like).

REFERENCE SIGNS LIST

1 . . . Liquid Chromatograph Mass Spectrometer
10 . . . Liquid Chromatograph
11 . . . Mobile Phase Container
12 . . . Pump
13 . . . Injector
14 . . . Column
15 . . . Passage
20 . . . Mass Spectrometer
21 . . . Ionization Chamber
211 . . . ESI Probe
212 . . . Heated Capillary
22 . . . First Intermediate Vacuum Chamber
221 . . . Ion Guide
222 . . . Skimmer
23 . . . Second Intermediate Vacuum Chamber
231 . . . Ion Guide
24 . . . Analysis Chamber
25 . . . Front Quadrupole Mass Filter
251 . . . Pre-Rod Electrode
252 . . . Main Rod Electrode
26 . . . Collision Cell
261 . . . Multipole Ion Guide
27 . . . Rear Quadrupole Mass Filter
271 . . . Pre-Rod Electrode
272 . . . Main Rod Electrode
28 . . . Ion Detector
40 . . . Control-and-Processing Unit
41 . . . Storage Section
42 . . . Condition Setter
43 . . . Measurement Executor
44 . . . Voltage Value Determiner
45 . . . Condition Checker
46 . . . Maintenance Alert Generator
5 . . . Input Unit
6 . . . Display Unit
C . . . Ion Beam Axis

The invention claimed is:

1. A method for mass spectrometry of a sample introduced from a predetermined passage, the method comprising:

introducing a predetermined fluid medium into the passage, wherein a substance is initially adhered to a wall surface of a member forming the passage, and the substance separates from the wall surface and mixes into the medium;

ionizing the medium together with the substance mixed into the medium;

performing a mass separation and a measurement of an ion or ions having one or more previously determined mass-to-charge ratios generated from the substance, under each of a plurality of measurement conditions which differ from each other in a value of voltage applied to at least one electrode included in one or more electrodes provided in a mass spectrometer; and determining a value of voltage applied to each of the one or more electrodes so that an intensity of each of the ion or ions having the one or more mass-to-charge ratios satisfies a previously determined criterion.

2. A chromatograph mass spectrometer including a chromatograph and a mass spectrometer combined together, comprising:

a medium supplier configured to supply a medium as a mobile phase or carrier gas;

a passage configured to introduce, into the mass spectrometer, the medium supplied from the medium supplier, wherein a substance is initially adhered to a wall surface of a member forming the passage, and the substance is configured to separate from the wall surface and mix into the medium;

an ionizer configured to ionize the medium together with the substance mixed into the medium;

a measurement executer configured to perform a mass separation and a measurement of an ion or ions having one or more previously determined mass-to-charge ratios generated from the substance in the ionizer, using a plurality of measurement conditions which differ from each other in a value of voltage applied to at least one electrode included in one or more electrodes provided in the mass spectrometer; and a voltage value determiner configured to determine a value of voltage applied to each of the one or more electrodes so that an intensity of each of the ion or ions having the one or more mass-to-charge ratios satisfies a previously determined criterion.

3. The chromatograph mass spectrometer according to claim 2, wherein:

the mass spectrometer includes a quadrupole mass filter having a pre-rod electrode and a main rod electrode; and the at least one electrode is the pre-rod electrode.

4. The chromatograph mass spectrometer according to claim 2, wherein:

the measurement executer is configured to repeatedly perform an operation in which an intensity of an ion under a first measurement condition is compared with an intensity of the ion under a second measurement condition in which one or more of the values of the applied voltages included in the first measurement condition are modified, and when the intensity of the ion under the second measurement condition is higher, an intensity of the ion is measured under a third measurement condition in which one or more of the values of the applied voltages in the second measurement condition are modified.

5. The chromatograph mass spectrometer according to claim 2, further comprising:

a storage section in which information of a reference value of applied voltage for each of the one or more electrodes is stored; and a comparison result output section configured to output a result of a comparison of a value of applied voltage determined by the voltage value determiner and the reference value of applied voltage stored in the storage section for the one or more electrodes.

6. The chromatograph mass spectrometer according to claim 5, wherein the comparison result output section further includes a maintenance information output section configured to output information for urging a user to maintain an electrode of the one or more electrodes when a difference between the voltage applied to that electrode determined by the voltage value determiner and the reference value of applied voltage stored in the storage section exceeds a previously determined threshold.

* * * * *